(No Model.)
D. D. JOHNSON.
APPARATUS FOR STORING LIQUID AMMONIA.
No. 373,741. Patented Nov. 22, 1887.
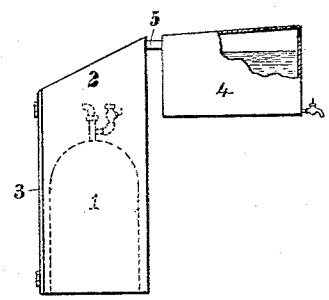
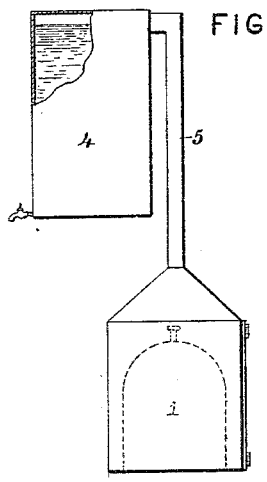
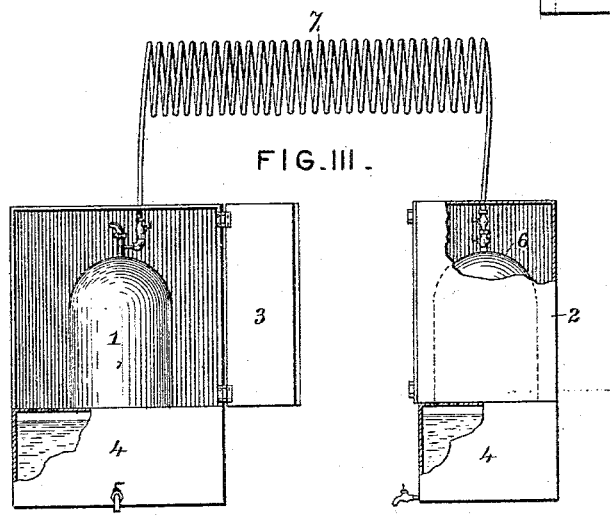

UNITED STATES PATENT OFFICE.

DAVID D. JOHNSON, OF THE UNITED STATES ARMY.

APPARATUS FOR STORING LIQUID AMMONIA.

SPECIFICATION forming part of Letters Patent No. 373,741, dated November 22, 1887.

Application filed October 9, 1886. Serial No. 215,813. (No model.)

*To all whom it may concern:*

Be it known that I, DAVID D. JOHNSON, a citizen of the United States, lieutenant in the Fifth Artillery, United States Army, have invented certain new and useful Improvements in Safety-Receivers for Ammonia and other Gases, of which the following is a specification.

My invention has for its object the absorption of ammonia or other gas easily absorbed by water when the ammonia or other gas escapes by leakage or the bursting of its containing-vessel. To this end I place a tank, receiver, bottle, or other vessel containing ammonia or other gas largely absorbed by water in a box capable of being tightly closed, and having connection with a water-vessel in such manner that gas escaping from its containing tank or vessel may be absorbed by the water and saved instead of escaping into the air.

In the accompanying drawings I have shown various forms of my invention.

Figure I represents in side elevation a form in which the water-tank is placed to the rear of the closet or box containing the ammonia-holder. Fig. II represents in front elevation a form in which the water-tank is placed above the box. Fig. III shows the use of the invention in artificial refrigeration, two closets being employed, one for containing anhydrous and the other hydrated ammonia.

1 may represent a holder for ammonia or other gas capable of being absorbed by water. To prevent the waste of gas which may escape from the holder 1, either by reason of the imperfection of its closing devices or by the bursting of the holder, I provide a closet or box, 2, capable of being tightly closed by a door, 3, which may be packed with rubber.

I design in collecting these gases to prevent their escaping into the air and provide for their absorption by water. To this end I provide a water-tank, 4, which may have a spigot for drawing off the water when sufficiently charged with ammonia or when it is necessary to renew the water.

In Fig. I, I have shown the water-tank 4 connected with the upper part of the closet or box 2 at rear by means of a pipe, 5. The top of the closet or box 2 is inclined upwardly toward the pipe, so as to direct the gas into the latter, and the top of the tank 4 is inclined upwardly away from said pipe to facilitate the rapid absorption of the gas by the water by permitting the gas to expand more freely over the surface of the latter.

To provide for rapid absorption of gas, it is best that the water-compartment should be broad and comparatively shallow.

In Fig. II, I have shown the tank placed above the level of the closet 2, the top of the closet being of pyramidal form to direct the gas to the connecting-pipe 5. In Fig. III the tank is placed simply in the bottom of the closet, the gas-holder and hydrated-ammonia holder being supported above the bottom by suitable perforated cells or slats.

I have here represented an apparatus in which the ammonia is used for artificial refrigeration during the passage of the anhydrous ammonia from vessel 1 to the vessel 6 for containing the hydrated ammonia. Between these two vessels is placed the cooling-pipe 7, the connections of which with the vessels 1 and 6 are inclosed within the closets 2. The closets may be in the form here shown, or any other form which will allow the placing of the ammonia-receiver therein and the tight closing of the closet, and instead of having a separate closet or receiver for each vessel 1 and 6 a single receiver may be provided for both.

The quantity of water in the tank should be sufficiently abundant to absorb all the ammonia that may leak from the vessel; or if there is any probability of the vessel bursting or leaking largely the quantity of water should be such as to absorb all the ammonia or other gas in the vessel.

Instead of having the water-tank, as here shown, capable of being emptied by a stopcock, I may provide for the insertion into the closet or into the water-box of an open vessel of water, which may be readily removed for replenishment. A pyramid shape, base up, may be given to the water-compartment to prevent bursting should ice be formed. The ice will absorb the ammonia rapidly, melting as the ammonia is absorbed.

In using my invention I first put a sufficient quantity of water in the water-tank, place the ammonia-holder in position, and close the closet-door. It will not be necessary to change or renew the water until a good deal has evaporated or leaked out, or until it has become well saturated with the ammonia or other gas.

I am aware that a receptacle for containing a solution of some suitable carbonate and having within it another receptacle for containing a suitable acid, the latter receptacle being adapted to be broken, and hence generate, when the two solutions combine, carbonic-acid gas, is old in fire-extinguishers; and, also, that such construction, when the outer receptacle has free communication through suitable tubes with another receptacle, also containing a solution of carbonate, is old in fire-extinguishers. I therefore do not claim such apparatus, or any apparatus for generating gas; but,

Having thus described my invention, the following is what I claim as new therein and desire to secure by Letters Patent:

1. The combination of receivers for anhydrous ammonia and hydrated ammonia, respectively, a cooling-pipe connecting the two, a closet or closets surrounding the two holders, and a water tank or tanks having connection with such closet or closets, substantially as and for the purposes set forth.

2. The combination of a holder for ammonia or other gas and a tight closet for containing said holder, a water-tank having connection with said closet, and having the top inclined upwardly away from the means of connection with said closet, substantially as and for the purposes set forth.

3. A safety-receiver for vessels containing ammonia or other gas capable of absorption by water, consisting of a closet having a door through which the said vessels can be removed or replaced, a support for the vessel within the closet, and a water-tank having free communication with the air of the closet containing the vessel of ammonia or other gas.

DAVID D. JOHNSON.

Witnesses:
I. H. BLAKE,
FREDERICK E. FRANKLIN.